United States Patent [19]

Rutt et al.

[11] Patent Number: 5,427,573

[45] Date of Patent: Jun. 27, 1995

[54] CLEANING APPARATUS

[76] Inventors: Larry L. Rutt, HC 68, Box 81, Chappell, Nebr. 69129; Robert L. Zook, 412 W. 12th St., Cozad, Nebr. 69130

[21] Appl. No.: 189,447

[22] Filed: Jan. 31, 1994

[51] Int. Cl.⁶ .............................................. A01F 11/00
[52] U.S. Cl. ........................................ 460/142; 460/98
[58] Field of Search ...................... 460/142, 98, 97; 56/327.1

[56] References Cited

U.S. PATENT DOCUMENTS

| | | |
|---|---|---|
| 2,630,123 | 3/1953 | Womack ............................ 460/142 |
| 4,257,217 | 3/1981 | McClendon ....................... 56/327 R |
| 4,395,867 | 8/1983 | Cooper et al. .................... 56/327 R |
| 4,402,175 | 9/1983 | Watenpaugh ..................... 56/327 R |
| 4,546,602 | 10/1985 | Cosimati ........................... 56/327 R |

FOREIGN PATENT DOCUMENTS 896299  3/1972  Canada ................................ 460/142

*Primary Examiner*—Terry Lee Melius
*Attorney, Agent, or Firm*—Leydig, Voit & Mayer

[57] ABSTRACT

A cleaning apparatus for fruits or vegetables includes a plurality of rods disposed in parallel about a common axis and defining a space having an intake opening and a discharge opening. The rods include driven rods rotated about their respective axes and nondriven idler rods. The rods are moved along a closed circular path surrounding the axis as the driven rods are rotated. The food items being cleaned can be fed through the cleaner from the intake to the discharge opening by a feed mechanism in the form of an auger brush.

19 Claims, 5 Drawing Sheets

CLEANING APPARATUS

BACKGROUND OF THE INVENTION

1. Field of the Invention

This invention relates to a cleaning apparatus for removing leaves, stalks, etc. from vegetables and fruit at the time of harvesting. It also relates to an automatic harvester equipped with such a cleaning apparatus.

2. Description of the Related Art

Many varieties of vegetables and fruit can be mechanically harvested by automatic crop pickers. However, an automatic picker generally picks not only the vegetable itself, but also some of the stalks and leaves attached thereto. In addition, dead leaves and other debris lying on the ground surrounding the growing plant inevitably get mixed up with the vegetables being picked. Therefore, before the vegetables can be packaged for shipment, they must be cleaned to remove the stalks, leaves, and other unwanted materials.

A variety of cleaning devices for use in cleaning picked vegetables have been developed, but they are generally bulky and not suitable for mounting directly on a harvester. For example, some cleaning devices can only be used in a fixed location, such as in a processing plant. This means that a great volume of unwanted materials must be transported along with the picked vegetables from the fields to the processing plant.

SUMMARY OF THE INVENTION

Accordingly, it is an object of the present invention to provide a cleaning apparatus for vegetables and fruits which can be easily mounted on a moving harvester.

It is another object of the present invention to provide a cleaning apparatus which can be readily adapted for use with different sizes and types of vegetables and fruits.

It is another object of the present invention to provide an automatic harvester equipped with such a cleaning apparatus.

A cleaning apparatus for fruits or vegetables according to the present invention includes a plurality of rods disposed in parallel about a common axis and defining a space having an intake opening and a discharge opening. The rods include driven rods rotated about their respective axes and nondriven idler rods. Preferably, the rods are moved along a closed path surrounding the axis at the same time that the driven rods are rotated. The rotation of the driven rods and the simultaneous movement of the rods along the closed path produces a cleaning effect which can separate stalks, leaves, debris, and other undesirable materials from the items being cleaned.

In a preferred embodiment, the axis of the cleaner is substantially horizontal, and the cleaner includes a feed mechanism in the form of an auger brush for feeding the items to be cleaned through the cleaner from the intake to the discharge opening.

The closed path along which the rods are moved can have various shapes, but in a preferred embodiment, the closed path is circular.

A cleaning apparatus according to the present invention is not restricted to use with a specific type of vegetable or fruit, and can be used to clean a wide variety of agricultural products, including all types of peppers, tomatoes, okra, and cucumbers.

Because of its convenient size and shape, a cleaning apparatus according to the present invention is particularly suitable for mounting on an automatic harvester. However, it can be used in any convenient location and need not be portable. For example, it can be permanently mounted on the floor of a food processing factory.

DESCRIPTION OF PREFERRED EMBODIMENTS

Figure 1:
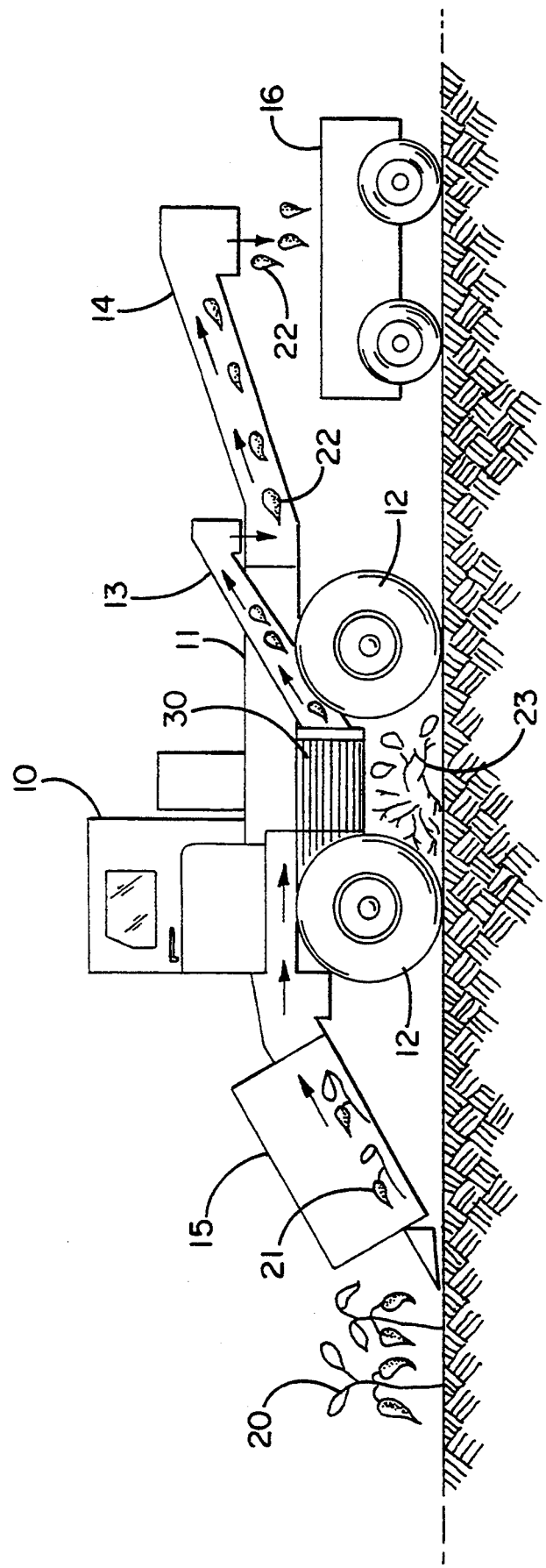
FIG. 1 is a schematic side elevation of an embodiment of an automatic harvester equipped with a cleaning apparatus according to the present invention.

FIG. 1 illustrates an embodiment of an automated harvester equipped with a cleaning apparatus (referred to below as a cleaner) according to the present invention. In this embodiment, the harvester is a pepper harvester, but the cleaner of the present invention can be used equally well with other types of harvesters.

The illustrated harvester includes a self-propelled ground transportation system 10 equipped with an internal combustion engine or other drive source which can move the harvester through fields of peppers to be harvested as well as to power various items of equipment mounted on the harvester. Normally, the harvester travels from right to left in the figure. On the front end (the left end) of the ground transportation system 10 is mounted one or more automatic picker heads 15 for pepper plants 20. Various types of automatic picking devices for peppers are known in the art, and the present invention is not restricted to any particular type. An example of a suitable picker head 15 is an Automated Pepper Picker available from Automated Harvesting Systems, Inc. of Chappell, Nebr., which can be mounted on a Ground Transportation System available from the same company. The picker head 15 is designed to strip peppers from upright pepper plants 20, removing the peppers but leaving the plants 20 substantially intact. However, leaves, stalks, and other debris are frequently attached to or admixed with the as-picked peppers 21. The as-picked peppers 21 are automatically transported from the picker head 15 to a cleaner 30 mounted on the ground transportation system 10 to the rear of the picker head 15. The cleaner 30 can be disposed in any location, but because of its compactness, it can be conveniently mounted beneath the chassis 11 of the ground transportation system 10 between the front and rear wheels 12. The cleaner 30 has an intake end (the left end in the figure) connected to the picker head 15 by an unillustrated conveyer, and a discharge end (the right end) connected to another conveyer 13. Inside the cleaner 30, stalks, leaves, and debris 23 are separated from the peppers 22 and fall onto the ground beneath the cleaner 30, while the cleaned peppers 22 are discharged through the discharge end of the cleaner 30 and onto the conveyer 13. The cleaned peppers 22 are carried by conveyer 13 to another conveyer 14, which discharges the cleaned peppers 22 into the bed of a trailer or truck 16 travelling behind the harvester through the pepper fields. The rear conveyer 14 generally is pivotally connected to the ground transportation system 10 for pivoting about a vertical axis in accordance with the location of the trailer 16.

If the harvester includes a plurality of picker heads 15, a single cleaner 30 may be connected to more than one of the picker heads 15, or a separate cleaner 30 may be provided for each picker head 15. For example, a plurality of cleaners 30 may be installed side by side in tandem beneath the chassis 11.

Figure 2:
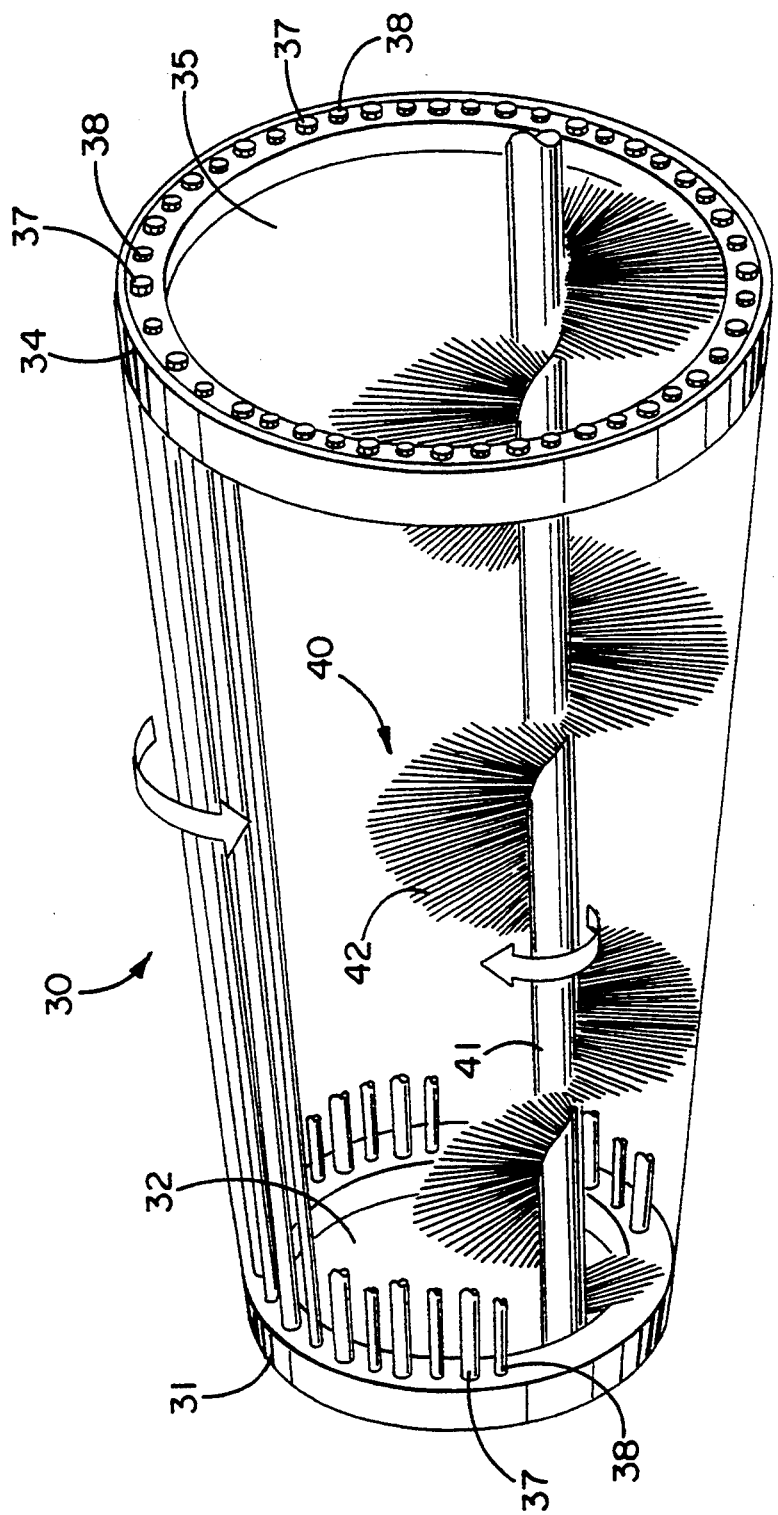
FIG. 2 is a broken-away perspective view of a portion of the cleaning apparatus of FIG. 1.

FIG. 2 is a perspective view of a portion of the cleaner 30. It has a generally the shape of a cylinder with a plurality of rigid rods 37 and 38 disposed around its periphery. A front frame in the form of an annular front collar 31 and rear frame in the form of an annular rear collar 34 are disposed at opposite ends of the cylinder. The front collar 31 has an opening 32 which serves as an intake opening for the cleaner 30, while the rear collar 34 has an opening 35 which serves as a discharge opening. The rods extend between and preferably are supported by the two collars 31 and 34. The rods include driven rods 37 which are rotated about their respective axes by a drive mechanism, and idler rods 38 which are not driven but which are free to rotate about their respective axes. Alternatively, the idler rods 38 may be fixed such that they are not free to rotate about their respective axes. All of the rods 37 and 38 are moved along a closed circular path extending around the circumference of the cylinder.

In this embodiment, every other rod around the circumference of the cleaner 30 is a driven rod 37 and the remaining rods are idler rods 38, although the ratio of driven rods 37 to idler rods 38 can be varied. For example, every third rod could be a driven rod 37. Adjoining rods are separated by gaps, which are large enough to allow stalks, leaves, and debris to fall through the gaps while preventing the peppers 22 from doing so. The driven rods 37 are shown as having a larger outer diameter than the idler rods 38, but it is possible for the idler rods 38 to have the same or larger outer diameter than the driven rods 37. Some examples of suitable rod diameters are from 0.75 to 1.25 inches for the idler rods 38 and up to 1.25 inches or more for the driven rods 37.

In this embodiment, the spacing between the axes of adjacent rods 37 and 38 is constant around the periphery of the cleaner 30, and in addition, the gap between any two adjacent rods is constant. However, uniformity of the spacing of adjoining rods and uniformity of the gaps is not essential to the operation of the invention, and the spacing and gap size can be varied around the circumference of the cleaner 30.

The cleaner 30 also includes a feed mechanism for feeding peppers axially through the cleaner 30. The feed mechanism is in the form of a helical brush, referred to as an auger brush 40, rotatably mounted about an axis extending in the fore and aft direction of the cleaner 30. When rotated about its axis, the auger brush 40 functions as an Archimedes screw to carry peppers from the intake to the discharge end of the cleaner 30. The feeding action performed by the auger brush 40 enables the axis of the cleaner 30 to be horizontal or even sloping upwards from the front to the rear end of the cleaner 30. The fact that the axis of the cleaner 30 can be horizontal is advantageous because it means that the overall height of the cleaner 30 can be lower than if the cleaner 30 need to be sloped. The auger brush 40 also produces a scrubbing action which helps to remove debris from the peppers.

Figure 3:
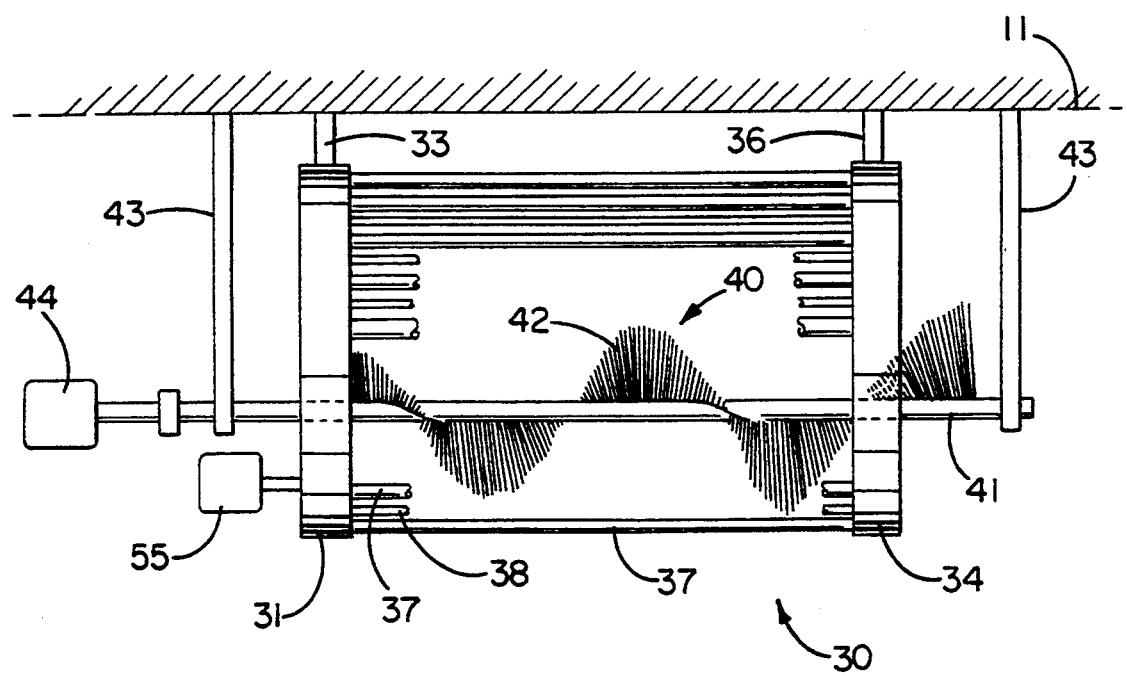
FIG. 3 is a schematic side elevation of the cleaning apparatus of FIG. 2.

As schematically shown in FIG. 3, the two collars 31 and 34 are secured by corresponding brackets 33 and 36 to the underside of the chassis 11 of the ground transportation system 10, while the shaft 41 of the auger brush 40 is journalled by unillustrated bearings supported by brackets 43, which can be connected to the chassis 11 or to the collars 31 and 34. Preferably the brackets allow the cleaner 30 to be detached from the chassis 11 for ease of maintenance and repair. The auger brush 40 rotated about its axis by a first drive mechanism 44, while the drive mechanism for the rods 37 and 38 is powered by a second drive mechanism 55. The drive mechanisms 44 and 55 can be of any suitable type, hydraulic or electric motors being particularly suitable for use in farm equipment. Preferably, the auger brush 40 and the rod drive mechanism are separately controllable so that the speeds and directions of operation of each can be separately varied. However, by employing a suitable power take-off mechanism, it is possible to employ the same drive mechanism for both the auger brush 40 and the rod drive mechanism.

The rods can be made of any material which is strong enough to withstand the shocks and vibrations imparted to them during operation in the field. An example of a suitable material is hollow stainless steel tubing. The outer surfaces of the rods are preferably smooth so as not to damage the peppers or other vegetables being cleaned.

The auger brush 40 comprises a rigid shaft 41, such as a hollow metal rod, to the outer periphery of which bristles 42 are secured in the shape of a helix. The bristles 42 are preferably fairly flexible and soft so as not to damage the peppers 22 as the bristles 42 push them to the discharge end of the cleaner 30. An example of suitable bristles 42 are polypropylene bristles, such as used in street cleaners. The diameter of the auger brush 40 is not critical, but it is preferably smaller than the inner diameter of the cylinder defined by the rods 37 and 38 so that the auger brush 40 will not interfere with the tumbling of the peppers 22 produced by the movement of the rods 37 and 38 along the closed circular path or with the cleaning action produced by the rotation of the driven rods 37. In the present embodiment, the axis of the shaft 41 supporting the auger brush 40 is below the longitudinal axis of the cleaner 30 and positioned such that the bristles 42 of the auger brush 40 contact the rods 37 and 38 in the lower portion of the cleaner 30. The auger brush 40 preferably extends over the entire length of the cleaner 30 so that peppers can be fed smoothly through the cleaner 30. The auger brush 40 in this embodiment has a constant outer diameter over its length, and its axis is parallel to the longitudinal axis of the cleaner 30, but if the outer diameter of the auger brush 40 varies along its length, it is possible for the axis of the auger brush 40 to be nonparallel to the axis of the cleaner 30.

Figure 4:
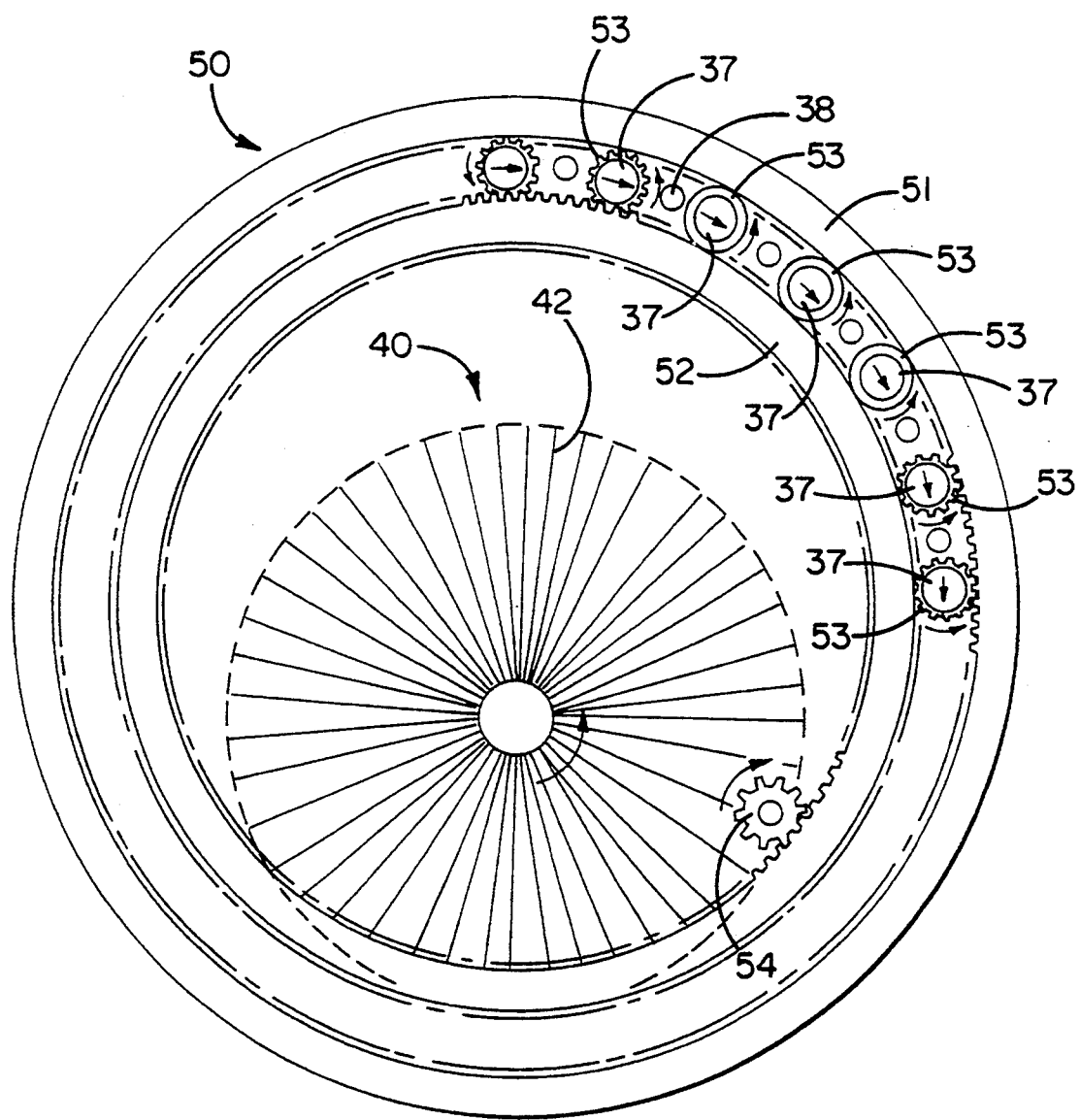
FIG. 4 is a front end view of the planetary drive mechanism of the cleaning apparatus of FIG. 2.
Figure 5:
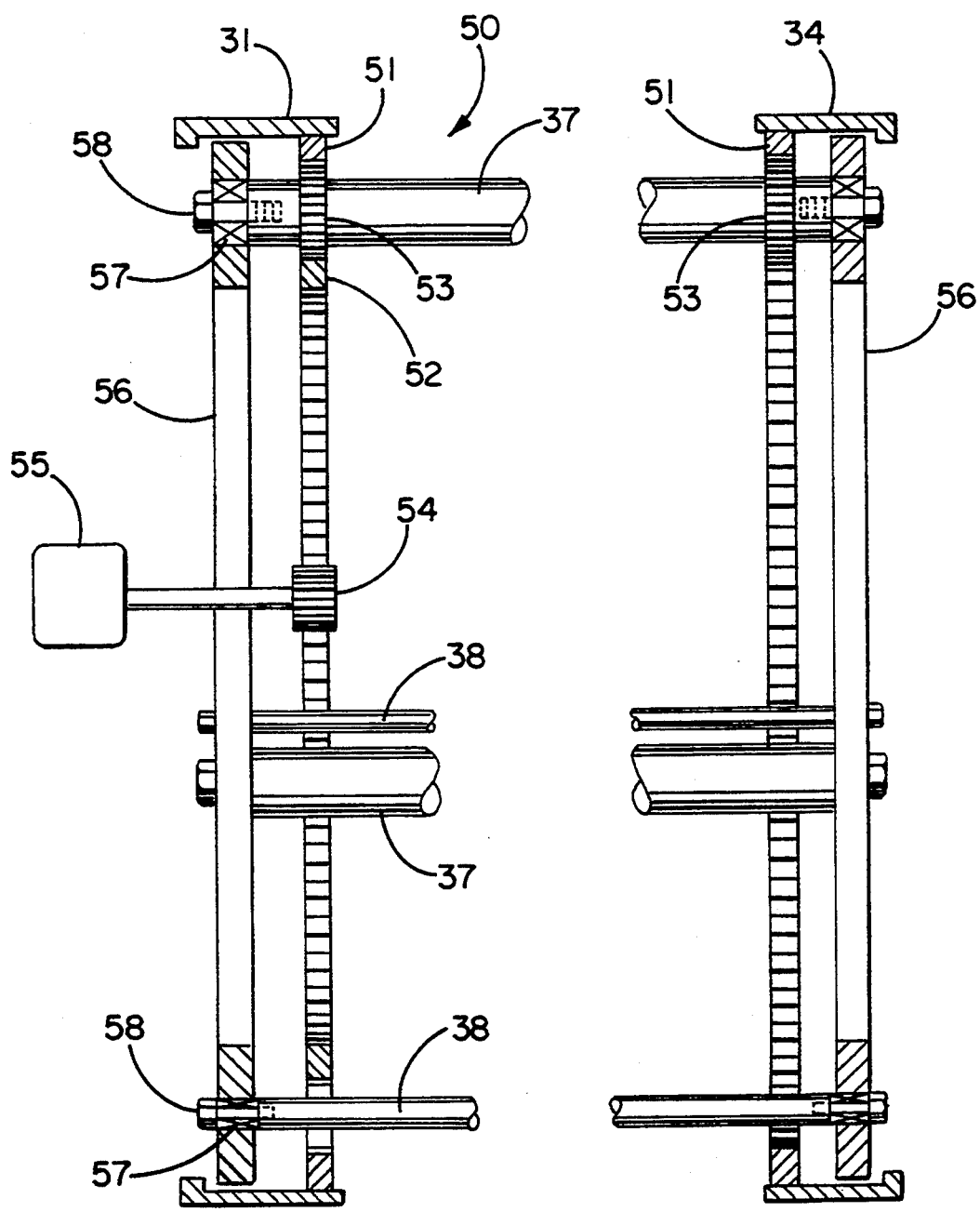
FIG. 5 is a longitudinal cross section view of the planetary drive mechanism of FIG. 4.

Any suitable means can be employed to move the rods 37 and 38 along a closed circular path around the cleaner 30 while rotating the driven rods 37 about their respective axes. When the cleaner 30 is cylindrical in form, as in this embodiment, a planetary drive mechanism 50 such as that shown in FIGS. 4 and 5 is particularly suitable. FIG. 4 is a front end view and FIG. 5 is a longitudinal cross-sectional view of the planetary drive mechanism 50. At the intake or front end of the cleaner 30 (the left end in FIG. 5) are disposed an outer ring gear 51 and an inner ring gear 52 concentric with the outer ring gear 51. The outer ring gear 51, which has internal teeth extending around its inner periphery, is secured to the inner periphery of the front collar 31 by bolts or other suitable means. The inner ring gear 52 has both external teeth and internal teeth extending around its periphery. A pinion 53 which engages the internal teeth of the outer ring gear 51 and the external teeth of the inner ring gear 52 is secured to each of the driven rods 37 near their front ends. The inner ring gear 52, supported by the pinions 53 of the driven rods 37, floats inside the outer ring gear 51. The inner ring gear 52 is rotated about its center by a pinion 54 secured to the output shaft of the drive motor 55.

The proper spacing between adjacent rods 37 and 38 is maintained by an annular bearing plate 56 which fits loosely inside the front collar 31. Each of the rods 37 and 38 is rotatably supported in the bearing plate 56 by a corresponding bearing 57 mounted in the bearing plate 56. Preferably, at least the idler rods 38 are supported in a manner such that they can be readily replaced or exchanged in the field. For example, in FIG. 5, the end of each rod 37 and 38 stops short of the bearing plate 56, and the weight of the rod is transferred to the corresponding bearing 57 by a removable shoulder bolt 58 which screws into the end of the rod. By detaching the shoulder bolts 58, the rods can be disconnected from the bearing plate 56 and removed from the cleaner 30. By replacing the idler rods 38 with ones of a different diameter, it is possible to vary the spacing between adjacent rods in accordance with the size of the vegetables being cleaned. For cleaning small vegetables, idler rods 38 having a relatively large outer diameter can be employed to achieve a small gap between adjoining rods, while for cleaning large vegetables, idler rods 38 having a relatively small outer diameter can be employed to set the gap to a larger value, thereby making it easier for stalks, leaves, etc. to fall through the gaps.

In this embodiment, the actual weight of the rods 37 and 38 is carried by the outer ring gear 51, and the bearing plate 56 serves only to keep the rods suitably spaced, so it is not necessary for there to be any contact between the bearing plate 56 and the front collar 31.

A rear bearing plate 56 corresponding to the front bearing plate 56 is connected to the rear end (the right end in FIG. 5) of each rod in the same manner as at the front bearing plate 56. A rear outer ring gear 51 corresponding to the front ring gear 51 and having internal teeth is secured to the rear collar 34 adjoining the rear bearing plate 56, and a portion of the driven rods 37 (such as every third driven rod) have a pinion 53 secured thereto and engaging with the rear outer ring gear 51. When the driven rods 37 are rotated about their axes, the engagement between the rear pinions 53 and the rear outer ring gear 51 produces a drive force causing the rear ends of the driven rod 37 on which the rear pinions 53 are mounted to be driven along the closed path around the axis of the cleaner 30 in tandem with the front ends of the same rods, thereby preventing twisting of the front and rear ends of the rods. Like the front bearing plate 56, the rear bearing plate 56 does not need to contact the rear collar 34.

When the auger brush 40 is rotated in a first direction about its axis, it will move peppers 22 towards the rear of the cleaner 30, while if it is rotated in the opposite direction, it will move peppers 22 towards the front of the cleaner 30. Accordingly, the auger brush 40 will normally be rotated only in the first direction. The direction of movement of the rods 37 and 38 along the closed path about the axis of the cleaner 30 can be the same as or different from the direction of rotation of the auger brush 40. A somewhat better cleaning effect is obtainable when the direction of movement of the rods along the closed path is opposite from the rotational direction of the auger brush 40, as shown by the arrows in FIG. 4.

The dimensions of the cleaner 30 can be selected in accordance with the nature of the items being cleaned and the volume which must pass through the cleaner 30 as the harvester travels through fields.

The operation of the illustrated embodiment is as follows. As-picked peppers 21 which are introduced from the picker head 15 into the intake opening 32 at the front end of the cleaner 30 are gradually pushed towards the discharge opening 35 at the rear end of the cleaner 30 by the rotation of the auger brush 40. As the as-picked peppers 21 are moved backwards, they are tumbled by the movement of the rods 37 and 38 along the closed path surrounding the axis of the cleaner 30. The tumbling motion separates the peppers from loose leaves and other debris 23 with which the peppers are mixed, and the debris 23 falls to the bottom of the cleaner 30 and through the gaps between adjacent rods 37 and 38. At the same time, the rotation of the driven rods 37 about their axes strips the stalks and leaves from the peppers 22, and the former are pulled to the outside of the cleaner 30 to fall to the ground, while the now clean peppers 22 remain inside the cleaner 30 and continue to be pushed to the rear of the cleaner 30. Upon reaching the discharge end of the cleaner 30, the cleaned peppers 22 enter the first conveyer 13 and then the second conveyer 14 and are eventually deposited in the trailer 16. Virtually all the stalks and leaves 23 (80 to 90%, for example) attached to the peppers 22 when they first enter the picker head 15 are left in the field, so the volume of materials which must be transported back from the fields in the trailer 16 is considerably less than if the peppers were harvested without being cleaned.

The speed of movement of the rods 37 and 38 along the closed path may be sufficiently high that centrifugal force causes a layer of peppers to be formed along at least a substantial portion of the inner periphery of the cleaner 30 and preferably the entire inner periphery. An example of a suitable speed of movement of the rods 37 and 38 along the closed path is up to 60 to 75 rpm or more. The rotational speed of the auger brush 40 can be approximately the same as the speed of movement of the rods along the closed path.

The movement of the rods 37 and 38 along a closed path is advantageous not only in that it produces the above-described tumbling motion, but also in that it prevents stems and other debris from clogging up the gaps between adjacent rods. As a result, the rods 37 and 38 at the lower portion of the cleaner 30 are always clean so that debris can easily fall through the gaps.

The present invention is not restricted to using a planetary drive mechanism 50, and any drive mechanism which can rotate the driven rods 37 about their respective axes while carrying the rods 37 and 38 along a closed path around the longitudinal axis of the cleaner 30 can be employed. For example, the rods 37 and 38 could be connected with one another by an endless chain, and the axial rotation of the driven rods 37 could be produced by sprockets or by rolling contact with a stationary ring.

What is claimed is:

1. A cleaning apparatus for vegetables or fruit comprising:

first and second frames having an intake opening and a discharge opening, respectively, through which items to be cleaned can pass;

a plurality of first rods extending between the first and second frames and rotatably supported by the frames, each first rod separated from an adjoining first rod by a first gap; and a rod drive mechanism adapted for connection to a drive source and operatively connected to the first rods for rotating a plurality of the first rods about their respective axes in a first direction.

2. A cleaning apparatus according to claim 1 comprising a plurality of nondriven idler rods extending between the first and second frames, each of the idler rods disposed between a pair of the first rods and spaced from each of the adjoining first rods by a second gap.

3. A cleaning apparatus according to claim 2 wherein the idler rods are supported by the frames in a manner allowing rotation about their respective axes.

4. A cleaning apparatus according to claim 1 wherein the first rods are connected to the first and second frames to move along a closed path surrounding a common axis.

5. A cleaning apparatus according to claim 4 wherein the closed path is circular.

6. A cleaning apparatus according to claim 5 wherein the rod drive mechanism comprises a planetary drive mechanism.

7. A cleaning apparatus according to claim 2 wherein each second gap is smaller than the items to be cleaned.

8. A cleaning apparatus according to claim 1 wherein the first rods are disposed along a circle.

9. A cleaning apparatus according to claim 8 wherein the first rods are evenly spaced along the circle.

10. A cleaning apparatus according to claim 1 including a feed mechanism for feeding the items to be cleaned from the intake opening to the discharge opening.

11. A cleaning apparatus according to claim 10 further comprising a helical brush surrounded by the first rods.

12. A cleaning apparatus according to claim 11 wherein the first rods are disposed along a circle having an axis, and the axis of the brush is eccentric with respect to the axis of the circle.

13. A cleaning apparatus according to claim 12 wherein the axis of the brush is lower than the axis of the circle.

14. A cleaning apparatus according to claim 12 wherein the brush has a diameter smaller than a diameter of the circle and the brush contacts the first rods only in a lower portion of the circle.

15. A cleaning apparatus for vegetables or fruit comprising:

a plurality of rods extending parallel to a first longitudinal axis and defining a space having an intake opening and a discharge opening;

rod drive means adapted for connection to a drive source for transporting the rods along a closed path surrounding the first axis; and an auger brush disposed inside the space and having a second axis and bristles extending helically around the second axis and contacting at least a portion of the rods.

16. A harvesting apparatus comprising:

a picker for fruits or vegetables having a discharge end; and a cleaner connected to the picker for cleaning items picked by the picker and comprising a first frame having an intake opening communicating with the discharge end of the picker, a second frame having a discharge opening, a plurality of first rods extending between the first and second frames and rotatably supported by the frames, each first rod separated from an adjoining first rod by a first gap, a drive source, and a rod drive mechanism driven by the drive source and operatively connected to the first rods for rotating a plurality of the first rods about their respective axes in a first direction; and transport means for transporting the picker and the cleaner through a field containing fruits or vegetables to be picked.

17. A cleaning method for cleaning vegetables or fruits comprising:

inserting items to be cleaned into a cleaner comprising a plurality of spaced rods supported by a frame, each rod having a respective axis extending parallel to a first axis;

moving the rods along a closed path surrounding the first axis to exert a centrifugal force on the items to be cleaned; and rotating at least a portion of the rods about their respective axes as the rods are moving along the closed path.

18. A cleaning apparatus according to claim 11 wherein the brush has a longitudinal axis, further comprising a drive source drivingly connected to the brush for rotating the brush about its longitudinal axis.

19. A cleaning apparatus according to claim 15 further comprising a drive source for rotating the auger brush about the second axis to transport items to be cleaned from the intake opening to the discharge opening.

* * * * *